United States Patent
Thompson et al.

(10) Patent No.: US 9,485,125 B2
(45) Date of Patent: Nov. 1, 2016

(54) DYNAMICALLY RECONFIGURABLE CHANNELIZER

(71) Applicant: Raytheon Company, Waltham, MA (US)

(72) Inventors: Daniel Thompson, Hermosa Beach, CA (US); Harry B. Marr, Manhattan Beach, CA (US); Nnaemeka Okafor, Houston, TX (US); Chris McLean, Redondo Beach, CA (US); Aaron Romulo, Las Vegas, NV (US); Edwin Molina, Cudahy, CA (US)

(73) Assignee: RAYTHEON COMPANY, Waltham, MA (US)

( * ) Notice: Subject to any disclaimer, the term of this patent is extended or adjusted under 35 U.S.C. 154(b) by 207 days.

(21) Appl. No.: 14/305,685

(22) Filed: Jun. 16, 2014

(65) Prior Publication Data

US 2015/0365185 A1    Dec. 17, 2015

(51) Int. Cl.
H04J 3/04 (2006.01)
H04L 27/00 (2006.01)
H04B 1/00 (2006.01)
H04L 27/26 (2006.01)

(52) U.S. Cl.
CPC .............. *H04L 27/00* (2013.01); *H04B 1/001* (2013.01); *H04L 27/2652* (2013.01); *H04L 27/2657* (2013.01)

(58) Field of Classification Search
None
See application file for complete search history.

(56) References Cited

U.S. PATENT DOCUMENTS

| 2,989,744 | A | 6/1961 | Pettit |
| 3,170,158 | A | 2/1965 | Rotman |
| 3,720,952 | A | 3/1973 | Lawsine |
| 4,328,496 | A | 5/1982 | White |
| 4,613,863 | A | 9/1986 | Mitchell |
| 5,032,839 | A | 7/1991 | Even-Or |
| 5,717,620 | A | 2/1998 | Williams |
| 6,091,704 | A | 7/2000 | Butash |
| 6,285,197 | B2 | 9/2001 | Walker et al. |
| 6,898,235 | B1 | 5/2005 | Carlin et al. |
| 7,801,228 | B2 | 9/2010 | Lehne et al. |

(Continued)

FOREIGN PATENT DOCUMENTS

| CA | 1229926 A1 | 12/1987 |
| CN | 101241535 A | 8/2008 |

(Continued)

OTHER PUBLICATIONS

Chang et al., "Reconfigurable Architectures for Low Complexity Software Radio Channelizers using Hybrid Filter Banks," 10th IEEE Singapore International Conference on Communication systems, Oct. 2006, pp. 1-5.

(Continued)

*Primary Examiner* — Chi H Pham
*Assistant Examiner* — Raul Rivas
(74) *Attorney, Agent, or Firm* — Cantor Colburn LLP

(57) ABSTRACT

Embodiments are directed to a channelizer architecture configured to provide fully configurable frequency spectrum shaping by: establishing a plurality of parameters of the architecture, receiving an input signal, processing, by the architecture, the input signal in accordance with the plurality of parameters to obtain an output signal, analyzing the output signal to detect an object, and modifying the plurality of parameters to account for at least one dynamic condition associated with the object.

16 Claims, 5 Drawing Sheets

(56) References Cited

U.S. PATENT DOCUMENTS

| | | |
|---|---|---|
| 8,578,256 B2 | 11/2013 | Graef |
| 2001/0011893 A1 | 8/2001 | Walker et al. |
| 2001/0022811 A1 | 9/2001 | Lillington |
| 2003/0112904 A1 | 6/2003 | Fuller et al. |
| 2003/0133524 A1 | 7/2003 | Miller et al. |
| 2004/0189384 A1 | 9/2004 | Kemna et al. |
| 2007/0223607 A1 | 9/2007 | Lehne et al. |
| 2009/0163161 A1 | 6/2009 | Robinson et al. |
| 2010/0315292 A1 | 12/2010 | Ciu et al. |
| 2011/0274222 A1 | 11/2011 | Hinson |
| 2014/0105416 A1 | 4/2014 | Huttunen et al. |
| 2014/0210666 A1 | 7/2014 | Maltsev et al. |
| 2014/0241463 A1 | 8/2014 | Leenaerts et al. |

FOREIGN PATENT DOCUMENTS

| | | |
|---|---|---|
| EP | 0344794 A2 | 12/1989 |
| EP | 1596220 B1 | 11/2005 |
| EP | 2425635 A1 | 8/2013 |
| EP | 2728770 A2 | 5/2014 |
| EP | 2779473 A2 | 9/2014 |
| FR | 2689249 A1 | 10/1993 |
| GB | 2308034 A | 6/1997 |
| KR | 20080020078 A | 3/2008 |
| WO | 9306502 A1 | 4/1993 |
| WO | 9939517 A3 | 10/1999 |
| WO | 0011823 A1 | 3/2000 |
| WO | 0041340 A1 | 7/2000 |
| WO | 2005050241 A3 | 6/2005 |
| WO | 2012024507 A2 | 2/2012 |

OTHER PUBLICATIONS

Darak et al., "A reconfigurable filter bank for uniform and non-uniform channelization in multi-standard wireless communication receivers," IEEE 17th International Conference on Telecommunications (ICT), Apr. 4-7, 2010, pp. 951-956.

Lillington, "The pipelined frequency transform (PFT)", RF Engines, Electronic Engineering, Jun. 17, 2002, pp. 1-5.

Mahesh et al., "Coefficient decimation approach for realizing reconfigurable finite impulse response filters," IEEE International Symposium on Circuits and Systems, ISCAS, May 18-21, 2008, pp. 81-84.

Mahesh et al., "Reconfigurable low area complexity filter bank architecture based on frequency response masking for nonuniform channelization in software radio receivers", IEEE Transactions on Aerospace and Electronic Systems, vol. 47, No. 2, Apr. 2011, pp. 1241-1255.

Navarro et al. "Non-uniform channelization methods for next generation SDR PMR base stations", 2011 IEEE Symposium on Computers and Communications, Jul. 2011, pp. 620-625.

Sju, "Pipelined Frequency Transform PFT", RF Engines Limited Data Sheet, Apr. 29, 2002, pp. 1-25.

Smitha et al., "A new low power reconfigurable decimation interpolation and masking based filter architecture for channel adaptation in cognitive radio handsets," Physical Communication, 2, Jan. 2009, pp. 47-57.

Akpa et al., "N-parallel filter bank equivalent to tree structure", Electrical and Computer Engineering Conference Proceedings, 1994, pp. 494-496.

International Search Report and Written Opinion; PCT Application No. PCT/US2015/025537; International Filing Date: Apr. 13, 2015; Mailing Date: Jul. 28, 2015; 12 pages.

Lillington, "Flexible channelisation architectures for Software Defined Radio front ends using a Tuneable Pipelined Frequency Transform", IET Seminar Digest, vol. 2003, No. 1, 2003, pp. 1-13.

International Search Report and Written Opinion; International Application No. PCT/US2015/033207; International Filing Date: May 29, 2015; Date of Mailing: Sep. 17, 2015; 11 pages.

Ahnstrom et al., "Detection and direction-finding of spread spectrum signals using correlation and narrowband interference rejection", Proc. Nordic Matlab Conference, Copenhagen, Denmark, 2003, 5 pages.

Holler et al. "A 2-20-GHz Analog Lag Correlator for Radio Interferometry", IEEE Transactions on Instrumentation and Measurement, vol. 61, No. 8, Aug. 2012, pp. 2253-2261.

Houghton et al., "Direction finding on spread-spectrum signals using the time-domain filtered cross spectral density", IEEE Proceedings of Radar, Sonar and Navigation, vol. 144, No. 6, Dec. 1997, pp. 315-320.

Lambrecht et al., "True-Time-Delay Beamforming With a Rotman-Lens for Ultrawideband Antenna Systems", IEEE Transactions on Antennas and Propagation, vol. 58, No. 10, Oct. 2010, pp. 3189-3195.

Lehne et al., "A 0.13-um 1-GS/s CMOS Discrete-Time FFT Processor for Ultra-Wideband OFDM Wireless Receivers", IEEE Transactions on Microwave Theory and Techniques, vol. 59, No. 6, Jun. 2011, pp. 1639-1650.

Zhang et al., "Reconfigurable beam forming using phase-aligned Rotman lens", www.ietdl.org, The Institute of Engineering and Technology, 2012, pp. 326-330.

PCT International Search Report and Written Opinion; International Application No. PCT/US2015/039877; International Filing Date: Jul. 10, 2015; Date of Mailing: Oct. 6, 2015; 12 pages.

Balakrishnan et al., "Implementation of radix-2 and split-radix fast fourier transform algorithm using current mirrors", 2013 International Conference on Circuits, Power and Computing Technologies (ICCPCT), IEEE, Mar. 20, 2013, pp. 730-735.

International Search Report and Written Opinion; International Application No. PCT/US2015/016298; International Filing Date: Feb. 18, 2015; Date of Mailing: May 11, 2015; 14 pages.

Suh et al., "Low-Power Discrete Fourier Transform for OFDM: A Programmable Analog Approach", IEEE Transactions on Circuits and Systems I: Regular Papers, IEEE, vol. 58, No. 2, Feb. 1, 2011, pp. 290-298.

DYNAMICALLY RECONFIGURABLE CHANNELIZER

BACKGROUND

The present disclosure relates to electronics, and more specifically, to a detection of objects.

Hardware implementations for wideband systems cannot keep up with demanding bandwidth requirements. Therefore, a channelizer may be used to reduce a band into sub-bands, where each of the sub-bands is processed on parallel channels.

Channelizer circuits are designed for static channels and are defined at compile time. However, dynamic channels are needed to react to an ever-changing radio frequency (RF) environment. For example, an object (e.g., a threat) to be detected can effectively hop center frequencies, and may thereby at least temporarily elude detection. Furthermore, the object or threat might only be detectable for short periods of time (e.g., a so-called pop-up or pulse object/threat). Conventional receiver architectures may fail to capture such pop-up or pulse objects/threats.

SUMMARY

According to one embodiment, a method is used by a channelizer architecture to provide fully configurable frequency spectrum shaping, and the method comprises: establishing a plurality of parameters of the architecture, receiving an input signal, processing, by the architecture, the input signal in accordance with the plurality of parameters to obtain an output signal, analyzing the output signal to detect an object, and simultaneously modifying the plurality of parameter to account for at least one dynamic condition associated with the object.

According to another embodiment, an apparatus comprises: memory having instructions stored thereon that, when executed, cause the apparatus to: establish a plurality of parameters of the apparatus, receive an input signal, process the input signal in accordance with the plurality of parameters to obtain an output signal, analyze the output signal to detect an object, and simultaneously modify the plurality of parameters to account for at least one dynamic condition associated with the object.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
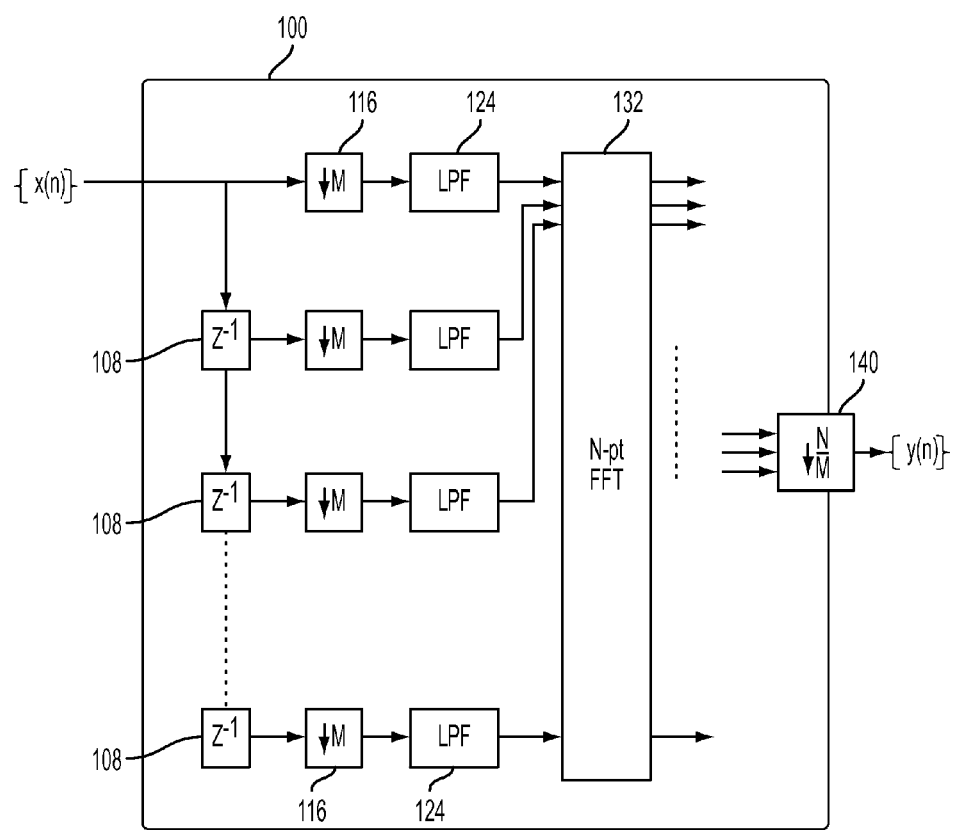
FIG. 1 is a block diagram of a channelizer.

It is noted that various connections are set forth between elements in the following description and in the drawings (the contents of which are included in this disclosure by way of reference). It is noted that these connections in general and, unless specified otherwise, may be direct or indirect and that this specification is not intended to be limiting in this respect. In this respect, a coupling between entities may refer to either a direct or an indirect connection.

Exemplary embodiments of apparatuses, systems, and methods are described for providing a fully reconfigurable, dynamic, and adaptable channelizer architecture across a wideband spectrum. In this manner, the architecture is configured to be dynamically reconfigured and updated through parameter-based registers in real-time. In some embodiments, the architecture may include one or more of a polyphase filter bank, varying decimation regimes (multirate circuits), fast Fourier transform (FFT) configurations, and an intensive switching fabric. One or more parameters (e.g., channel widths, center frequencies, number of channels, latency, etc.) associated with the architecture may be adjusted across the wideband spectrum, potentially in real-time or substantially in real-time, and on a pulse-to-pulse basis. Thus, an arbitrary frequency plan may be established where control can be provided in terms of, e.g., bandwidth, center frequency, and signal-to-noise ratio (SNR) of any potential signal/threat/object within any sub-band.

Referring to FIG. 1, a channelizer 100 is shown. The channelizer 100 may be used to reduce one or more frequency bands into sub-bands.

The channelizer 100 may receive a digital stream of data, denoted in FIG. 1 as $\{x(n)\}$. The digital stream of data x(n) may represent discrete samples of an analog signal, e.g., a radio frequency (RF) signal. The sampling rate or frequency may be established by one or more specifications or requirements, which may be a function of an application or environment in which the channelizer 100 is used. For example, a higher sampling rate may be used to enhance the resolution or clarity of the data x(n) that is obtained, potentially at greater cost in terms of hardware complexity or capability. Accordingly, a tradeoff may be made between resolution and cost in a given application.

The data x(n) may be subject to one or more delay elements $z^{-1}$ 108. The delay elements $z^{-1}$ 108 may serve to delay the samples associated with the data x(n).

The output of each of the delay elements $z^{-1}$ 108 may be provided to a down-converter M 116. The degree of the down-conversion, reflected by the parameter 'M', may be based on a number of channels that are used.

The output of each down-converter M 116 may be provided to a low pass filter (LPF) 124. An LPF 124 may be used to remove high frequency components, which may be indicative of noise.

The outputs of each LPF 124 may be provided to an n-point fast Fourier transform (FFT) algorithm 132. The FFT algorithm 132 may process the LPF 124 outputs to obtain the frequency components of the data x(n) at baseband.

The outputs of the FFT algorithm 132 may be provided to a converter 140. The converter 140 may be used to ensure that the outputs of the FFT algorithm 132 are transformed, as needed, to a common clock domain in terms of the output $\{y(n)\}$.

Figure 2A:
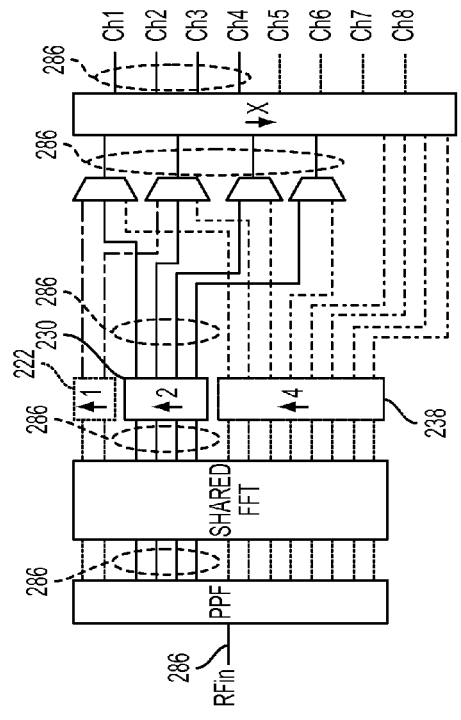
FIGS. 2A-2D illustrate instances of a channelizer architecture.
Figure 2C:
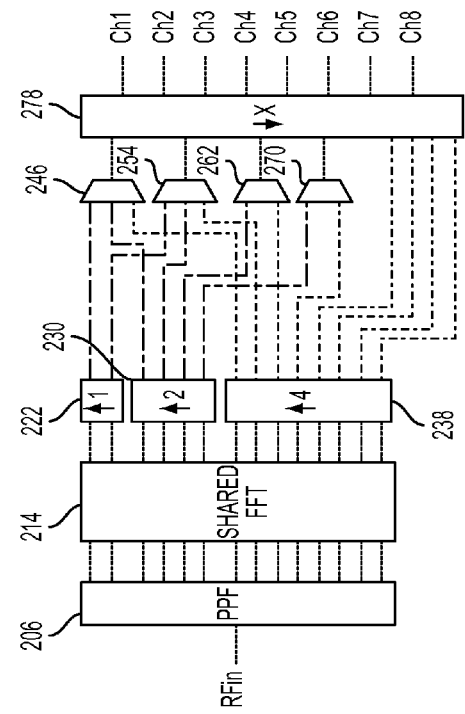
Figure 2B:
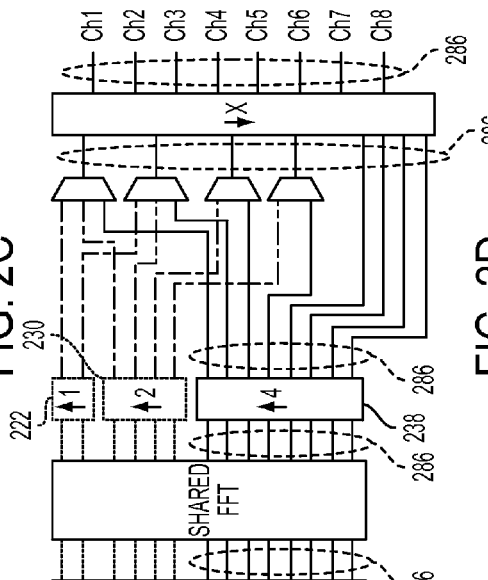
Figure 2D:
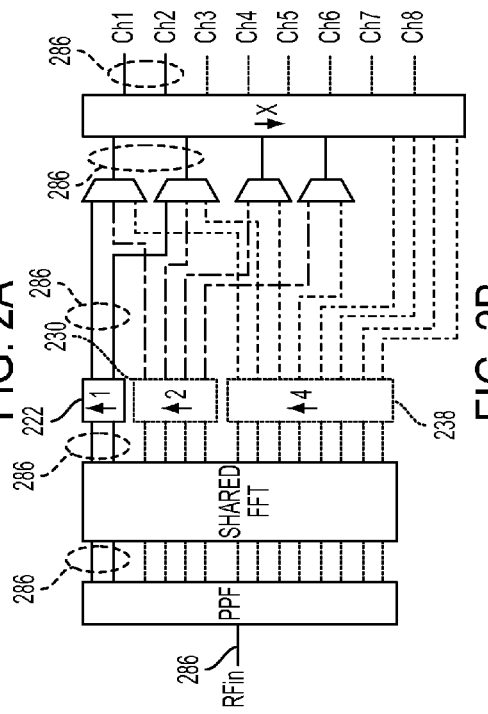

Referring now to FIGS. 2A-2D (collectively referred to as FIG. 2), each of FIGS. 2A-2D represents an instance of a channelizer architecture. FIG. 2A is used to illustrate and explain the circuit components and devices associated with the architecture. FIG. 2B is used to illustrate active circuits and wires when two channels are active. FIG. 2C is used to illustrate active circuits and wires when four channels are active. FIG. 2D is used to illustrate active circuits and wires when eight channels are active.

As shown in FIG. 2A, an RF data signal ($RF_{in}$) may be received by a poly-phase filter (PPF) 206. The PPF 206 may split the RF signal into a number of sub-bands. In some embodiments, the PPF 206 may correspond to, or include, one or more of the delay elements $z^{-1}$ 108, the down-converters M 116, and the LPFs 124 described above.

The outputs of the PPF 206 may be coupled to a shared FFT algorithm 214. The FFT algorithm 214 may correspond to the FFT algorithm 132 described above.

The outputs of the FFT algorithm 214 may be coupled to up-converters 222, 230, and 238. The up-converters 222, 230, and 238 may be configured to up-convert the frequency components output by the FFT algorithm 214 to a common sampling rate or clock domain.

The outputs of the up-converters 222, 230, and 238 may be coupled to multiplexers 246, 254, 262, and 270. Each of the multiplexers 246, 254, 262, and 270 may select (e.g., selectively activate) one of the inputs to the multiplexer as an output of the multiplexer. The selection is determined based on the current channelizer configuration parameters (channel widths, center frequencies, number of channels, latency, etc.). In this manner, the channelizer data lines are rerouted to a reusable output interface through a common clocking domain.

The outputs of the multiplexers 246, 254, 262, and 270 may be coupled to a down-converter 278. The down-converter 278 may be configured to down-convert the outputs of the multiplexers 246, 254, 262, and 270 to an original or initial sampling rate or frequency.

The down-converter 278 may provide up to eight active channel outputs, denoted in FIG. 2 as Ch1 through Ch8. In some embodiments, more or less than eight channel outputs may be provided. For example, in some embodiments twenty, one-hundred, and potentially even one-thousand channel outputs may be used. Thus, the provisioning of eight channel outputs in FIG. 2 is merely illustrative.

As described above, one or more of the components or devices described above in connection with FIG. 2 may be at least partially active or may be inactive, depending on the count and identification of channels Ch1 through Ch8 that are active. A component/device that is at least partially active may be at least partially utilized in accordance with its intended function or primary purpose. A component/device that is inactive may be: (1) allowed to float such that the output of the component/device is unknown or indeterminate, or (2) may be placed in a (stable) state where the output of the component/device is generally irrelevant, but stable or fixed.

In FIG. 2B (an instance of two channels, Ch1 and Ch2, active), PPF 206, FFT algorithm 214, up-converter 222, multiplexers 246 and 254, and down-converter 278 may be active. In FIG. 2B, up-converters 230 and 238 and multiplexers 262 and 270 may be inactive.

In FIG. 2C (an instance of four channels, Ch1 through Ch4, active), PPF 206, FFT algorithm 214, up-converter 230, multiplexers 246, 254, 262, and 270, and down-converter 278 may be active. In FIG. 2C, up-converters 222 and 238 may be inactive.

In FIG. 2D (an instance of eight channels, Ch1 through Ch8, active) PPF 206, FFT algorithm 214, up-converter 238, multiplexers 246, 254, 262, and 270, and down-converter 278 may be active. In FIG. 2D, up-converters 222 and 230 may be inactive.

In terms of wires or connections in FIGS. 2B-2D, those wires/connections that are inactive (e.g., un-selected) are indicated using dashed lines, while the wires/connections that are active (e.g., selected) are indicated using solid lines and are denoted by reference character 286. In some instances, a dashed oval or circle is used in association with the reference character 286 to denote a group of wires/connections, such that those wires/connections within the group that reside at least partially within the oval/circle are included as being active. It may be assumed that any wire/connection or groups of wires/connections that is not labeled with a reference character of 286 in FIGS. 2B-2D is inactive.

As described above in relation to FIG. 2, the channelizer architecture may be reconfigured to utilize a first number of channels at a first instance in time and to utilize a second number of channels at a second instant in time, wherein the first and second numbers of channels are potentially different. Changing the number of channels that are used merely represents one embodiment for responding to an ever-changing environment. As described above, any number of parameters (e.g., channel widths, center frequencies, number of channels, latency, etc.) associated with the architecture may be adjusted across a wideband spectrum, potentially in real-time and on a pulse-to-pulse basis.

Figure 3:
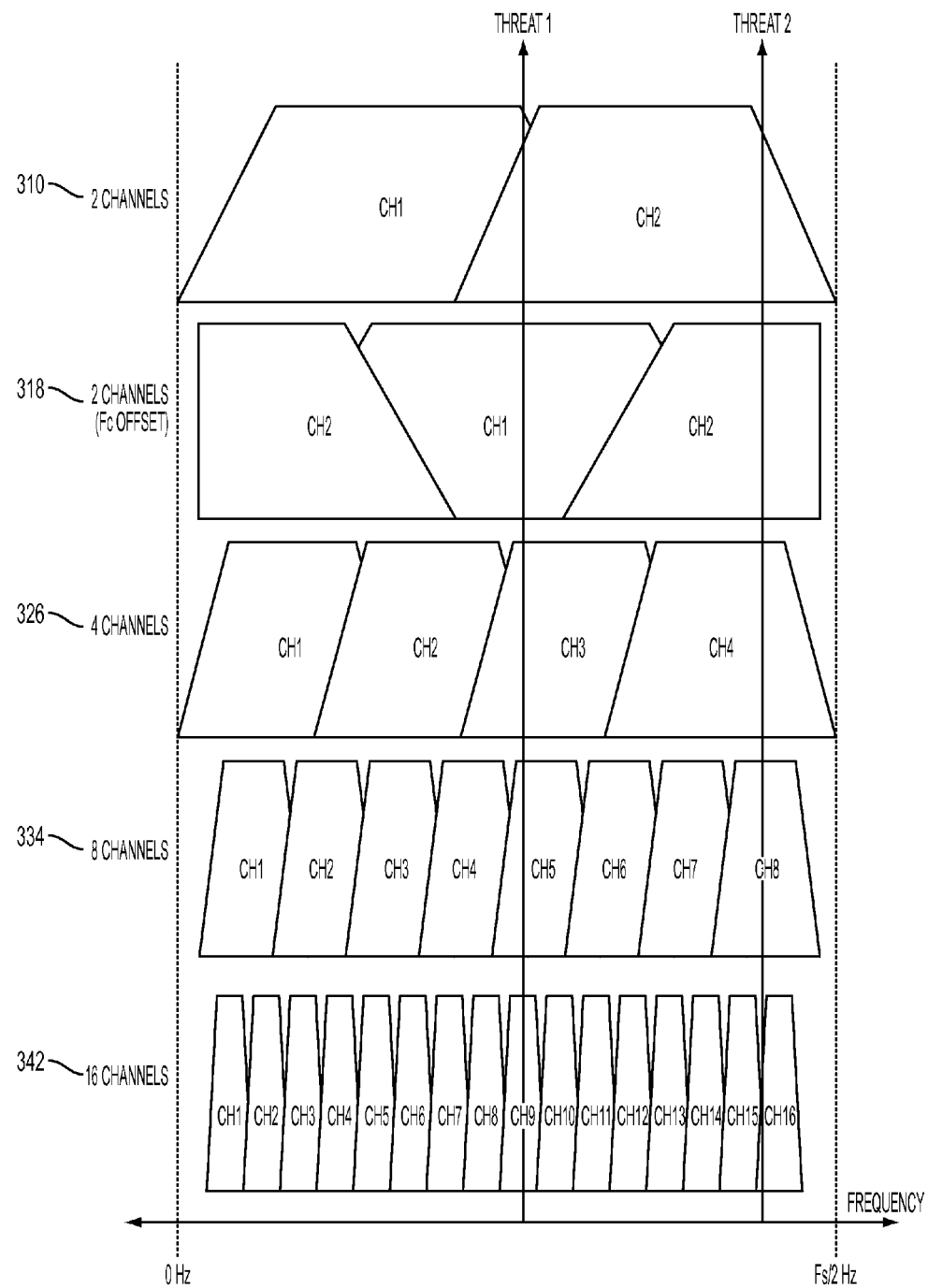
FIG. 3 depicts an embodiment used to illustrate a plan for responding to one or more threats.

Referring to FIG. 3, a plan for responding to two potential threats, denoted as Threat 1 and Threat 2 is shown. The plan may entail adjusting one or more parameters associated with a channelizer architecture as described further below. Threat 1 and Threat 2 may be dynamic in nature in the sense that one or both of them may be configured to modify one or more of their own operational parameters (e.g., modulation scheme, bandwidth, frequency, amplitude, etc.). According to at least one embodiment, a plurality of the parameters are simultaneously modified.

For purposes of illustration, the channelizer architecture initially may be configured with two channels (CH1 and CH2) as shown via reference character 310. Threat 1 and Threat 2 may be detected using configuration 310. But, Threat 1 and Threat 2 may elude detection using configuration 310, given that Threat 1 and Threat 2 are on the channel edges of the two channels.

Accordingly, the architecture may be reconfigured to adhere to configuration 318. Configuration 318 may again use two channels, but may experience a center frequency (Fc) offset relative to the configuration 310.

The use of the configuration 318 may represent an improvement relative to the configuration 310 in detecting Threat 1 and Threat 2. However, the use of only two channels may provide for a relatively low SNR. Accordingly, the configuration 326, which may include the use of four channels (CH1-CH4), may be used to improve the SNR relative to the configuration 318. However, the configuration 326 may once again place Threat 1 and Threat 2 near channel boundaries.

Using eight channels (CH1-CH8) as shown in configuration 334, Threat 2 may appear near the center of CH8 with an increase in SNR relative to any of configurations 310, 318, and 326. Similarly, using sixteen channels (CH1-CH16) as shown in configuration 342, Threat 1 may appear near the center of CH9 with an increase in SNR relative to any of configurations 310, 318, and 326 (and even 334).

One skilled in the art would appreciate that any number of algorithms may be used to decide whether, and to what extent, a given parameter associated with the channelizer architecture should be used or modified. Such algorithms may establish parameters for nodes as part of a mission planning phase. Alternatively, an executable control program may attempt to optimize a given parameter based on one or more inputs or conditions.

Figure 4:
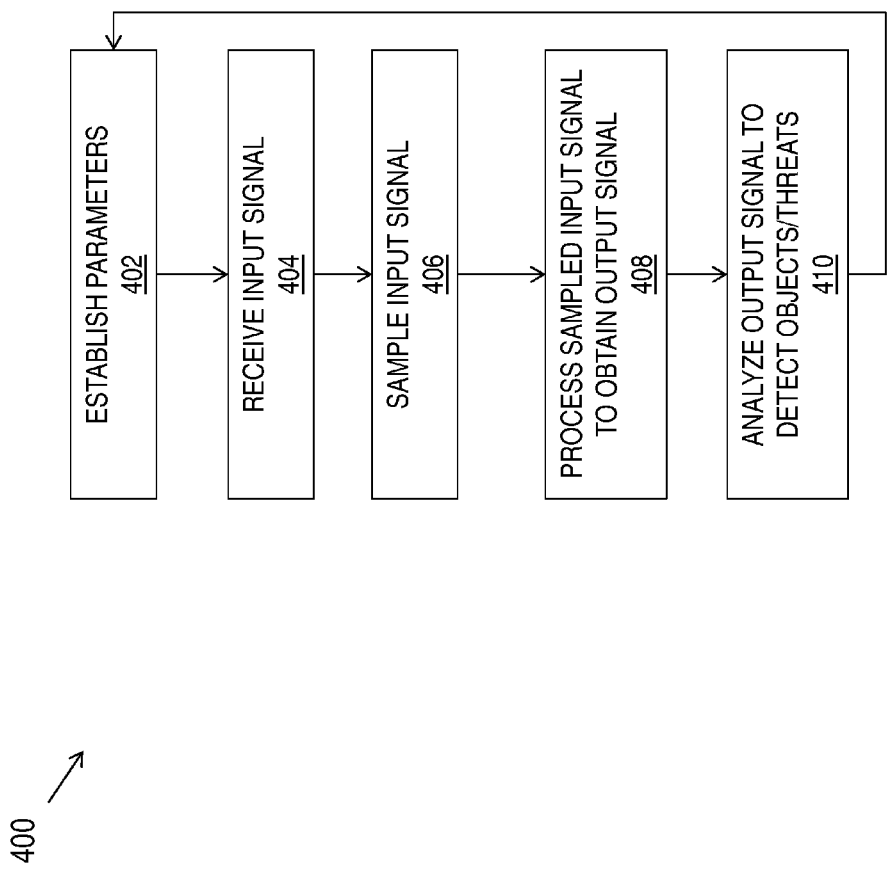
FIG. 4 illustrates a flow chart of an exemplary method.

Referring now to FIG. 4, a flow chart of an exemplary method 400 is shown. The method 400 may be tied to one or more devices, components, or systems, such as those described herein. For example, the method 400 may be used by a channelizer architecture to provide fully configurable frequency (e.g., RF) spectrum shaping.

In block 402, a set of parameters may be established for the architecture. As part of block 402, a determination may be made with respect to at least one parameter whether to enable or disable the parameter, to provide a value for the parameter, etc.

In block 404, an input signal may be received. The input signal may be associated with one or more frequencies or one or more frequency bands. The input signal may consume a relatively wide bandwidth.

In block 406, the input signal may be sampled.

In block 408, the sampled input signal may be processed to obtain an output signal. The processing may be based on parameter(s) of block 402.

In block 410, the output signal may be analyzed to determine the existence, location, and/or nature of one or more objects or threats.

From block 410, flow may proceed back to block 402. As part of the flow from block 410 to block 402, one or more parameters associated with the channelizer architecture are modified (e.g., a value changed, a parameter may be enabled or disabled, etc.). In this manner, a loop may be established to provide for a reconfiguration of the channelizer architecture, allowing the channelizer architecture to account for one or more dynamic conditions associated with the object or threat.

Embodiments of the disclosure may be implemented in connection with wideband systems. Such wideband systems may be deployed in the context of electronic warfare. Embodiments of the disclosure may be implemented in connection with narrowband systems, such as narrowband communications systems.

Aspects of the disclosure may be implemented in connection with one or more technologies. For example, in some embodiments aspects of the disclosure may be implemented in connection with one or more programmable logic devices (PLDs) or field programmable gate arrays (FPGAs). In some embodiments, one or more processors may be configured to execute instructions stored on a memory in order to perform one or more methodological acts, such as those described herein. In some embodiments, analog components or circuits may be used. Various mechanical components known to one of skill in the art may be used.

Figure 5:
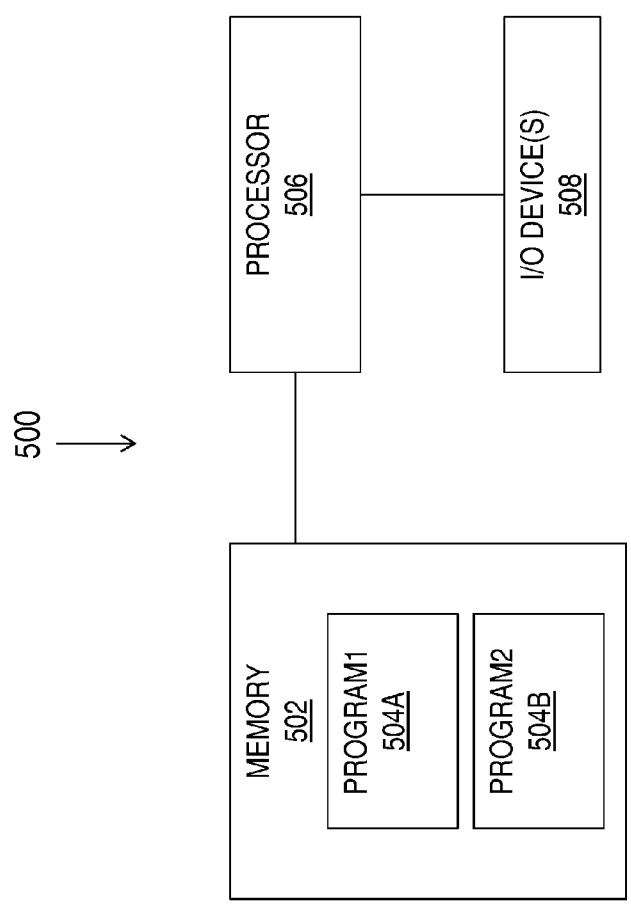
FIG. 5 is a schematic block diagram illustrating an exemplary computing system.

Referring to FIG. 5, an exemplary computing system 500 is shown. The system 500 is shown as including a memory 502. The memory 502 may store executable instructions. The executable instructions may be stored or organized in any manner and at any level of abstraction, such as in connection with one or more applications, processes, routines, procedures, methods, etc. As an example, at least a portion of the instructions are shown in FIG. 5 as being associated with a first program 504a and a second program 504b.

The instructions stored in the memory 502 may be executed by one or more devices, such as a processor 506. The processor 506 may be coupled to one or more input/output (I/O) devices 508. In some embodiments, the I/O device(s) 508 may include one or more of a keyboard or keypad, a touchscreen or touch panel, a display screen, a microphone, a speaker, a mouse, a button, a remote control, a joystick, a printer, a telephone or mobile device (e.g., a smartphone), etc. The I/O device(s) 508 may be configured to provide an interface to allow a user to interact with the system 500.

The system 500 is illustrative. In some embodiments, one or more of the entities may be optional. In some embodiments, additional entities not shown may be included. For example, in some embodiments the system 500 may be associated with one or more networks. In some embodiments, the entities may be arranged or organized in a manner different from what is shown in FIG. 5. One or more of the entities shown in FIG. 5 may be associated with one or more of the devices or entities described herein.

In some embodiments various functions or acts may take place at a given location and/or in connection with the operation of one or more apparatuses, systems, or devices. For example, in some embodiments, a portion of a given function or act may be performed at a first device or location, and the remainder of the function or act may be performed at one or more additional devices or locations.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

While the preferred embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. A method used by a channelizer architecture to provide fully configurable frequency spectrum shaping, the method comprising:
    establishing a plurality of parameters of the architecture;
    receiving an input signal;
    processing, by the architecture, the input signal in accordance with the plurality of parameters to obtain an output signal;
    analyzing the output signal to detect an object; and
    simultaneously modifying the plurality of parameters to account for at least one dynamic condition associated with the object,
    wherein the processing of the input signal further comprises down-converting the selected one or more outputs of the one or more up-converters to down-convert to an original clock domain.

2. The method of claim 1, further comprising:
sampling the received input signal;
wherein processing the input signal comprises processing the sampled signal.

3. The method of claim 1, wherein the plurality of parameters comprise a specification of at least one of: a channel width, a center frequency, a number of channels, and a latency.

4. The method of claim 1, wherein the at least one dynamic condition comprises a change of the condition in terms of at least one of: modulation scheme, bandwidth, frequency, and amplitude.

5. The method of claim 1, wherein the processing of the input signal comprises an application of a poly-phase filter to the input signal and application of a fast Fourier transform algorithm to an output of the poly-phase filter.

6. The method of claim 5, wherein the processing of the input signal further comprises an application of one or more up-converters to an output of the fast Fourier transform algorithm to up-convert to a common clock domain.

7. The method of claim 6, wherein the processing of the input signal further comprises selecting one or more outputs of the one or more up-converters.

8. The method of claim 1, wherein the plurality of parameters is established as part of a mission planning phase.

9. The method of claim 1, wherein the plurality of parameters is modified in accordance with a control program.

10. An apparatus comprising:
memory having instructions stored thereon that, when executed, cause the apparatus to:
establish a plurality of parameters of the apparatus;
receive an input signal;
process the input signal in accordance with the plurality of parameters to obtain an output signal;
analyze the output signal to detect an object; and
simultaneously modify the plurality of parameters to account for at least one dynamic condition associated with the object;
a poly-phase filter configured to split the input signal into a number of sub-bands,
wherein the instructions, when executed, cause the apparatus to:
apply a fast Fourier transform algorithm to an output of the poly-phase filter;
one or more up-converters coupled to an output of the fast Fourier transform algorithm, wherein the instructions, when executed, cause the apparatus to:
provide an up-conversion to a common clock domain using the one or more up-converters; and
a down-converter, wherein the instructions, when executed, cause the apparatus to:
down-convert the selected one or more outputs of the one or more up-converters to down-convert to an original clock domain.

11. The apparatus of claim 10, wherein the instructions, when executed, cause the apparatus to:
sample the received input signal,
wherein processing the input signal comprises processing the sampled signal.

12. The apparatus of claim 10, wherein the plurality of parameters comprises a specification of at least one of: a channel width, a center frequency, a number of channels, and a latency.

13. The apparatus of claim 10, wherein the at least one dynamic condition comprises a change of the condition in terms of at least one of: modulation scheme, bandwidth, frequency, and amplitude.

14. The apparatus of claim 10, further comprising:
one or more multiplexers, and
wherein the instructions, when executed, cause the apparatus to:
select one or more outputs of the one or more up-converters using the one or more multiplexers.

15. The apparatus of claim 10, wherein the plurality of parameters is modified in accordance with a control program.

16. The apparatus of claim 10, wherein the plurality of parameters is configured to be modified substantially in real-time and on a pulse-to-pulse basis, and wherein the apparatus is associated with at least one of a programmable logic device and a field programmable gate array.

* * * * *